(12) United States Patent
Kaifu et al.

(10) Patent No.: US 7,589,774 B2
(45) Date of Patent: Sep. 15, 2009

(54) IMAGE PICKUP APPARATUS HAVING NON-DESTRUCTIVELY READABLE IMAGE PICKUP MEANS FOR PICKING UP AN OBJECT IMAGE

(75) Inventors: Noriyuki Kaifu, Tokyo (JP); Kazuaki Tashiro, Kanagawa (JP); Osamu Yuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 11/143,726

(22) Filed: Jun. 3, 2005

(65) Prior Publication Data

US 2005/0259170 A1 Nov. 24, 2005

Related U.S. Application Data

(62) Division of application No. 09/916,264, filed on Jul. 30, 2001, now Pat. No. 6,947,084.

(30) Foreign Application Priority Data

Aug. 1, 2000 (JP) .............................. 2000-233652

(51) Int. Cl.
*H04N 5/217* (2006.01)
*H05G 1/64* (2006.01)

(52) U.S. Cl. ...................... 348/308; 348/241; 348/294; 378/98.8; 378/98.12

(58) Field of Classification Search ....... 378/98.7–98.9, 378/98.11–98.12; 348/297, 347
See application file for complete search history.

(56) References Cited

U.S. PATENT DOCUMENTS

| | | | | |
|---|---|---|---|---|
| 4,426,721 A | * | 1/1984 | Wang ..................... 250/370.09 |
| 4,544,948 A | * | 10/1985 | Okazaki ................... 378/98.12 |
| 5,161,178 A | * | 11/1992 | Honda et al. ............. 378/98.12 |
| 5,471,515 A | | 11/1995 | Fossum et al. ................. 377/60 |
| 5,528,043 A | | 6/1996 | Spivey et al. ........... 250/370.09 |
| 5,778,044 A | | 7/1998 | Bruijns ....................... 378/98.7 |
| 5,909,026 A | * | 6/1999 | Zhou et al. ................ 250/208.1 |
| 5,962,844 A | | 10/1999 | Merrill et al. ........... 250/214 A |
| 6,084,634 A | * | 7/2000 | Inagaki et al. ................ 348/294 |
| 6,084,939 A | * | 7/2000 | Tamura ..................... 378/98.2 |
| 6,307,915 B1 | | 10/2001 | Frojdh ...................... 378/98.8 |
| 6,333,963 B1 | | 12/2001 | Kaifu et al. ................ 378/98.2 |
| 6,404,854 B1 | | 6/2002 | Carroll et al. ............... 378/98.8 |
| 6,456,326 B2 | * | 9/2002 | Fossum et al. .............. 348/308 |
| 6,489,618 B1 | | 12/2002 | Morishita .............. 250/370.09 |
| 6,677,995 B1 | * | 1/2004 | Blanksby et al. ............. 348/301 |
| 6,847,698 B2 | | 1/2005 | Kaifu et al. ..................... 378/97 |
| 6,906,751 B1 | * | 6/2005 | Norita et al. ................. 348/349 |
| 6,975,355 B1 | * | 12/2005 | Yang et al. ................... 348/308 |

FOREIGN PATENT DOCUMENTS

EP 844588 A2 * 5/1998

* cited by examiner

*Primary Examiner*—David L Ometz
*Assistant Examiner*—Carramah J Quiett
(74) *Attorney, Agent, or Firm*—Fitzpatrick, Cella, Harper & Scinto

(57) ABSTRACT

An image sensing apparatus including an X-ray image sensing unit having a non-destructive read function, adapted to sense an object image, and a subtractor adapted to sequentially output as a corrected value a difference between a plurality of frames sequentially read out non-destructively from the X-ray image sensing unit and a frame read out before the plurality of frames.

9 Claims, 7 Drawing Sheets

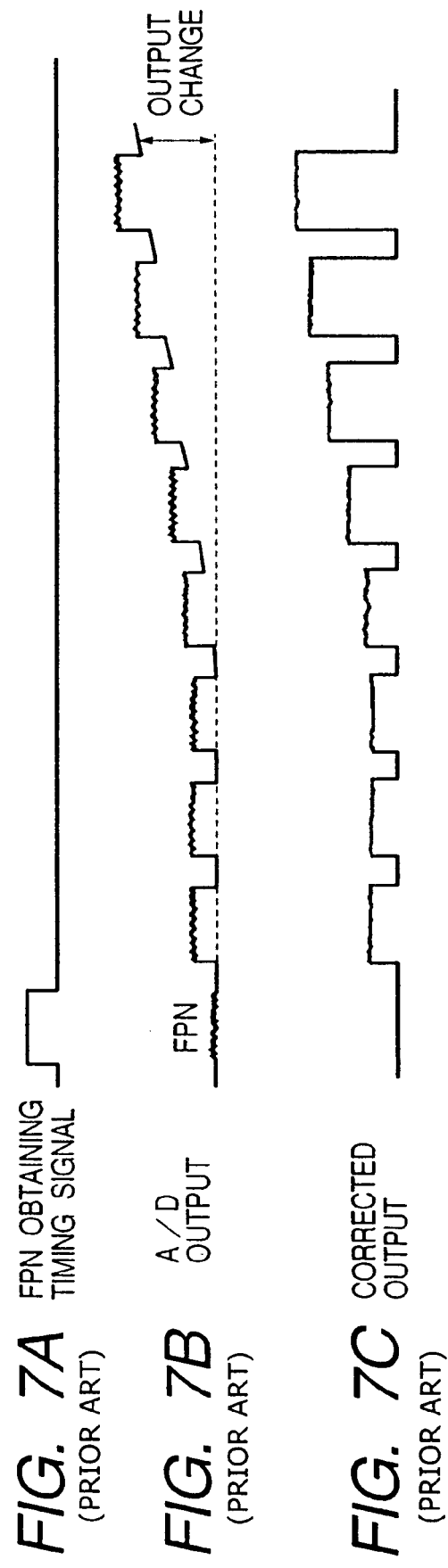

IMAGE PICKUP APPARATUS HAVING NON-DESTRUCTIVELY READABLE IMAGE PICKUP MEANS FOR PICKING UP AN OBJECT IMAGE

This application is a divisional of application Ser. No. 09/916,264, filed July 30, 2001, now allowed, the contents of which are incorporated by reference herein.

BACKGROUND OF THE INVENTION

1. Field of the Invention

The present invention relates to an image sensing apparatus and more particularly to an image sensing apparatus for sensing a moving image.

2. Related Background Art

FIG. 6 is a block diagram showing the structure of a conventional X-ray image sensing apparatus for sensing a moving image by utilizing X-rays. In FIG. 6, reference numeral 101 represents an X-ray source for radiating X-rays, and reference numeral 102 represents a X-ray image sensing panel. The X-ray image sensing panel 102 has a plurality of photoelectric conversion elements disposed two-dimensionally and a driver circuit for driving these elements. An X-ray radiated from the X-ray source 101 passes through a subject 103 and becomes incident upon the X-ray image sensing panel 102 which detects the image of the subject. The X-ray passed through the subject 103 is converted into visible light by an phosphor (not shown) and then becomes incident upon the X-ray image sensing panel 102.

Reference numeral 104 represents an A/D converter for A/D converting a signal supplied from the X-ray image sensing panel 102, reference numeral 105 represents an FPN (fixed pattern noises) memory for storing FPN corrected values, and reference numeral 106 represents an FPN obtaining timing generation circuit for generating a timing signal for obtaining an FPN corrected value. When the FPN obtaining timing generating circuit 106 generates a timing signal, a switch 107 is turned on so that FPN is read from the A/D converter 104 into the FPN memory 105. Reference numeral 108 represents a subtractor for subtracting a corrected value read from the FPN memory 106 from an output of the A/D converter 104, reference numeral 109 represents a monitor for displaying a sensed image, and reference numeral 110 represents a recording medium for recording image data.

FIGS. 7A to 7C are timing charts illustrating an operation of the X-ray image sensing apparatus shown in FIG. 6. FIG. 7A shows the FPN obtaining timing signal supplied from the FPN obtaining timing generating circuit 106, and FIG. 7B shows an output from the A/D converter 104. At the start of the image sensing, the FPN obtaining timing signal shown in FIG. 7A is supplied to the switch 107 to turn it on, so that the FPN corrected value is read from the A/D converter 104 into the FPN memory 105. Thereafter, during the image sensing, the subtractor 108 subtracts the corrected value stored in the FPN memory 106 from an output of the A/D converter 104 as shown in FIG. 7C, so that the corrected image data with FPN being removed is supplied to the monitor 109 and recording medium 110.

With the conventional moving image sensing apparatus, since the FPN corrected value is stored in the FPN memory at the start of the image sensing, the FPN corrected value is fixed. Namely, the FPN corrected data cannot be obtained always during the moving image sensing. For this reason, for example, if the offset of an output amplifier (an output stage amplifier in the X-ray image sensing panel) changes with a power supply fluctuation, a temperature change or the like, a change in the offset appears directly in an output as shown in FIG. 7B. Therefore, as shown in FIG. 7C, a change in the offset appears directly in the corrected output and the image quality is degraded.

SUMMARY OF THE INVENTION

It is an object of the invention to provide an image sensing apparatus capable of reliably performing FPN correction without being influenced by a change in an offset.

In order to achieve the above object, according to aspect of the present invention, there is provided an image sensing apparatus comprising: an image sensing unit having a non-destructive read function, adapted to sense an object image; and a subtractor circuit adapted to sequentially output a plurality of corrected values, wherein each of the plurality of corrected values is a difference between a first frame included in a plurality of frames sequentially read out non-destructively from the image sensing unit and a second frame included in the plurality of frames, read out before the frist frame.

Other objects and features of the present invention will become apparent from the following detailed description of embodiments when read in conjunction with the accompanying drawings.

BRIEF DESCRIPTION OF THE DRAWINGS

FIGS. 7A, 7B and 7C are timing charts illustrating the operation of the conventional apparatus shown in FIG. 6.

DETAILED DESCRIPTION OF THE PREFERRED EMBODIMENTS

Figure 1:
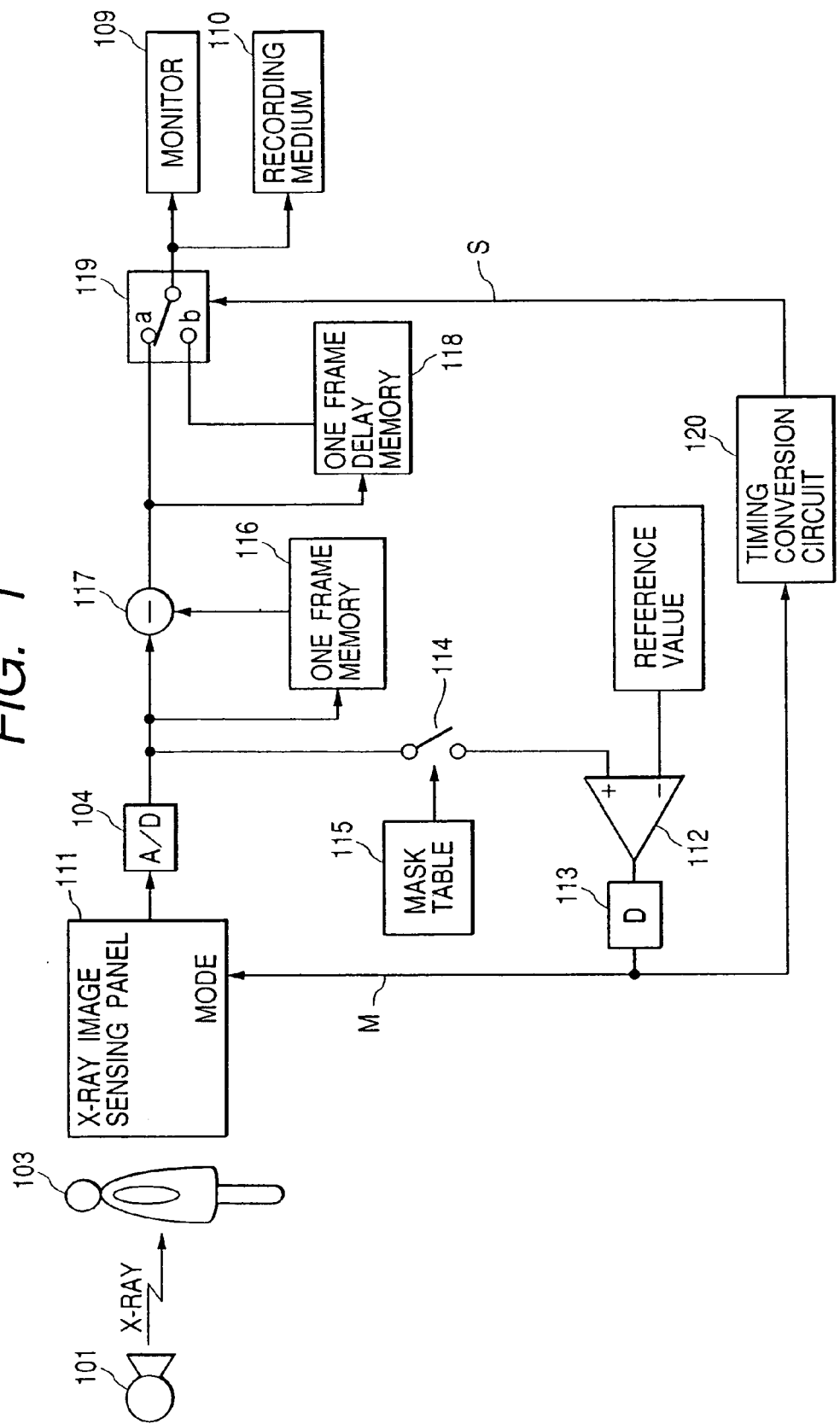
FIG. 1 is a block diagram showing the structure of an image sensing apparatus according to an embodiment of the invention.
Figure 6:
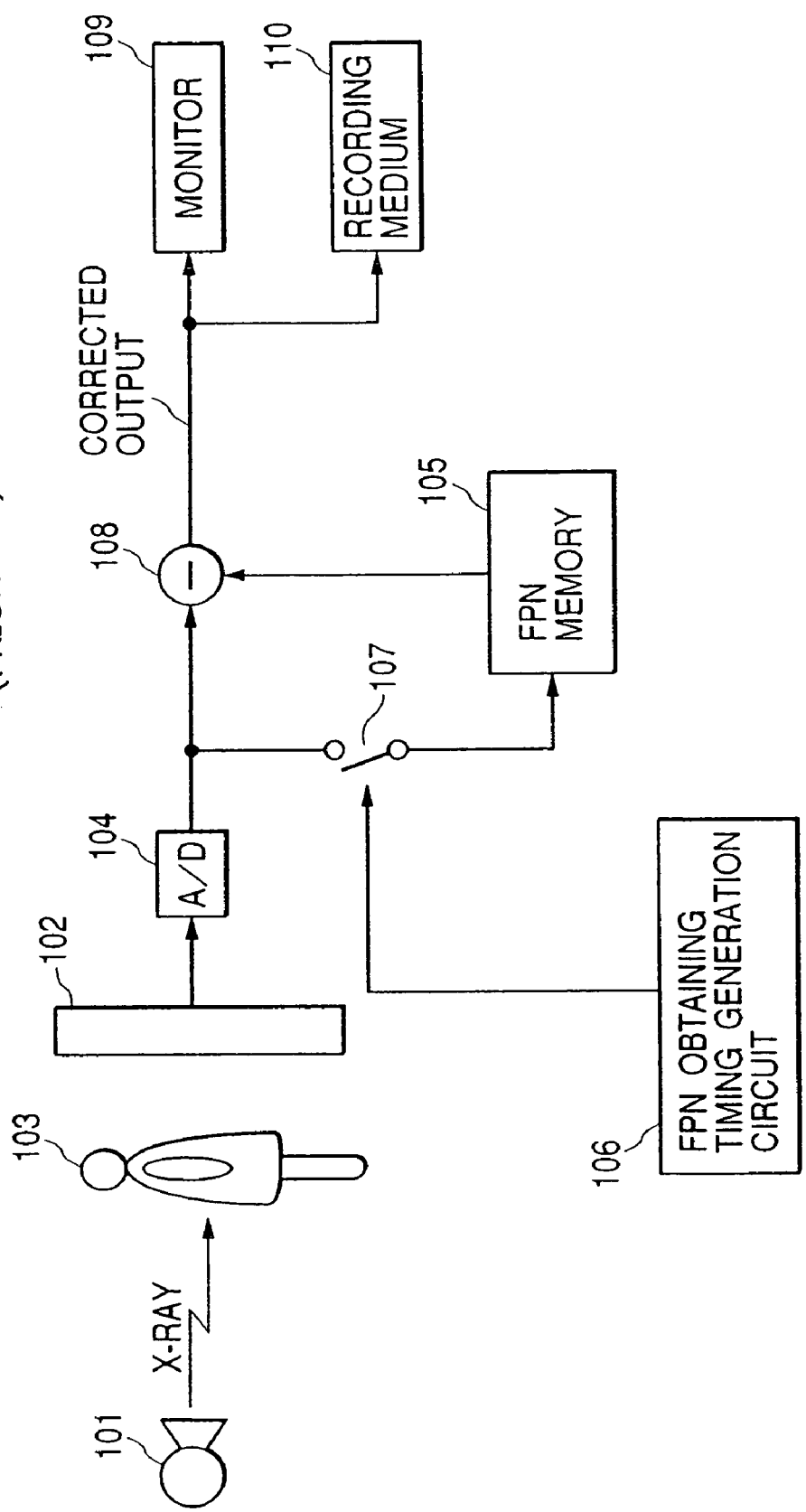
FIG. 6 is a block diagram showing the structure of a conventional X-ray image sensing apparatus.

An embodiment of the invention will be described in detail with reference to the accompanying drawings. FIG. 1 is a block diagram showing the structure of an image sensing apparatus according to the embodiment of the invention. In FIG. 1, like elements to those of the conventional apparatus shown in FIG. 6 are represented by using identical reference numerals. Referring to FIG. 1, an X-ray image sensing panel 111 is an image sensing panel capable of performing a normal read and a non-destructive read. The X-ray image sensing panel 111 has a plurality of photoelectric conversion elements arranged two-dimensionally and a driver circuit for driving the elements. The circuit structure and operation of the X-ray image sensing panel 111 will be later detailed.

A comparator 112 is a circuit for comparing a reference value which is set when reading the X-ray image sensing panel 111, with an output value of an A/D converter 104. In accordance with the comparison result between the output value of the A/D converter 104 and the reference value, the comparator 112 outputs a mode switching signal for switching a read mode of the X-ray image sensing panel 111. This mode switching signal is delayed by a delay 113 by a predetermined time.

During the image sensing, a signal is read non-destructively from the X-ray image sensing panel 111. During the non-destructive read, as will be described later, signal charges are accumulated without reset of a pixel so that an output of the A/D converter 104 gradually increases. In this embodiment, therefore, the reference value of the comparator 112 is set to a value slightly lower than the output of the A/D converter at a time when each pixel becomes saturated. When the output of the A/D converter 104 takes the reference value or higher, the read mode is changed to the normal read mode and the pixels of the X-ray image sensing panel 111 are reset.

A switch 114 is connected between the output of the A/D converter 104 and a positive terminal of the comparator 112. This switch 114 is driven by a signal supplied from a mask table 115. The mask table 115 stores beforehand the position information of each defective pixel of the X-ray image sensing panel 111. When an output of a defective pixel is to be output, the switch 114 is turned off so that the read mode is prevented from being switched by the output of the defective pixel. The mask table 115 also stores the position information of an invalid area other than the image sensing area. The switch 114 is turned off when an output of the invalid area other than the image sensing area is to be output, so that it is possible to prevent the read mode from being wastefully changed by the invalid area.

A one-frame delay memory 116 is a memory for storing output values of one frame from the A/D converter 104. A subtractor 117 is a circuit for subtracting an output value of each pixel of the previous frame stored in the one-frame delay memory 116 from an output value of each pixel currently output from the A/D converter 104. By reading a signal in the non-destructive mode from the X-ray image sensing panel 111 and subtracting the output value of the previous frame from the current output value, FPN is corrected.

A one-frame delay memory 118 is a memory for storing outputs values of one frame from the subtractor 117. A switch 119 selects either an output from the subtractor 117 or an output from the one-frame delay memory 118, in accordance with a signal supplied from a timing generation circuit 120. Although the details will be later given, the corrected value for the frame following the normal read cannot be used. In this embodiment, the switch 119 is switched to the one-frame delay memory 118 to output the corrected value for the previous frame stored in the one-frame delay memory 118. An X-ray source 101, a subject 103, a monitor 109 and a recording medium 110 are similar to those shown in FIG. 6. Similar to FIG. 1, a phosphor for converting an X-ray into visual light is omitted.

Figure 2:
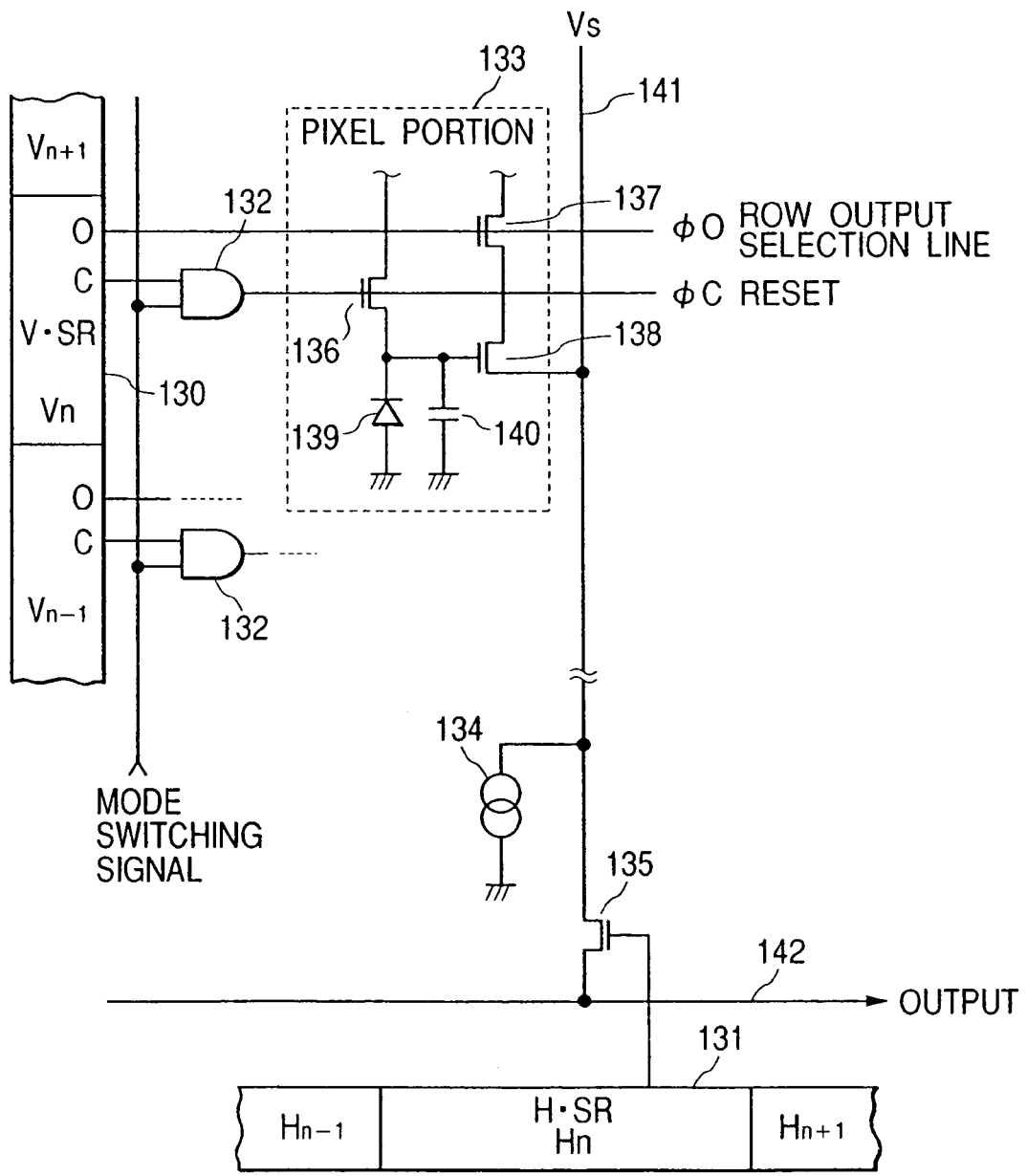
FIG. 2 is a circuit diagram showing part of an X-ray image sensing panel of the embodiment shown in FIG. 1.

FIG. 2 is a circuit diagram of the X-ray image sensing panel 111. FIG. 2 shows part of the X-ray image sensing apparatus. In FIG. 2, reference numeral 130 represents a vertical shift register, reference numeral 131 represents a horizontal shift register, reference numeral 132 represents an AND gate, and reference numeral 133 represents a pixel portion. Reference numeral 134 represents a constant current source, and reference numeral 135 represents a horizontal output switching MOS transistor. A mode switching signal is input to the AND gate 132 from the comparator 112 via the delay 113 shown in FIG. 1. Reference numeral 141 represents a vertical read line, and reference numeral 142 represents a horizontal read line.

The pixel portion 133 is constituted of a reset MOS transistor 136, a vertical output switching MOS transistor 137, a read MOS transistor 138, a photoelectric conversion element 139 and a capacitor 140. The pixel portion 133 and constant current source 134 constitute an amplifier having a voltage gain of 1, and can perform a read operation independently from the reset operation, without moving charges of the photoelectric conversion element 139.

More specifically, the photoelectric conversion element 139 and capacitor 140 are connected to the gate terminal of the read MOS transistor 138 of the pixel portion 133. This circuit connection and the constant current source 134 constitute a source follower circuit. Therefore, current will not flow into the gate terminal of the read MOS transistor 138, signal charges of the photoelectric conversion element 139 can be read to the vertical read line 141, and the signal charges of the photoelectric conversion element 139 will not move. It is therefore possible to perform the non-destructive read. In place of the constant current source 134, a resistor may be used. However, in order to improve a precision, it is desired to use the constant current source 134. In this embodiment, although the photoelectric conversion element is connected to the gate terminal of the read MOS transistor, the invention is not limited only thereto. For example, the photoelectric conversion element may be connected to an amplifier circuit or its control terminal to realize the non-destructive read. This is because current will not flow into the control terminal and charges will not move. Even if current flows, only charges much smaller than those necessary for output charges flow because of amplification by the circuit. Such small current is negligible. For example, the photoelectric conversion element may be connected to the base terminal of a bipolar transistor for reading to realize the non-destructive read.

Figure 3:
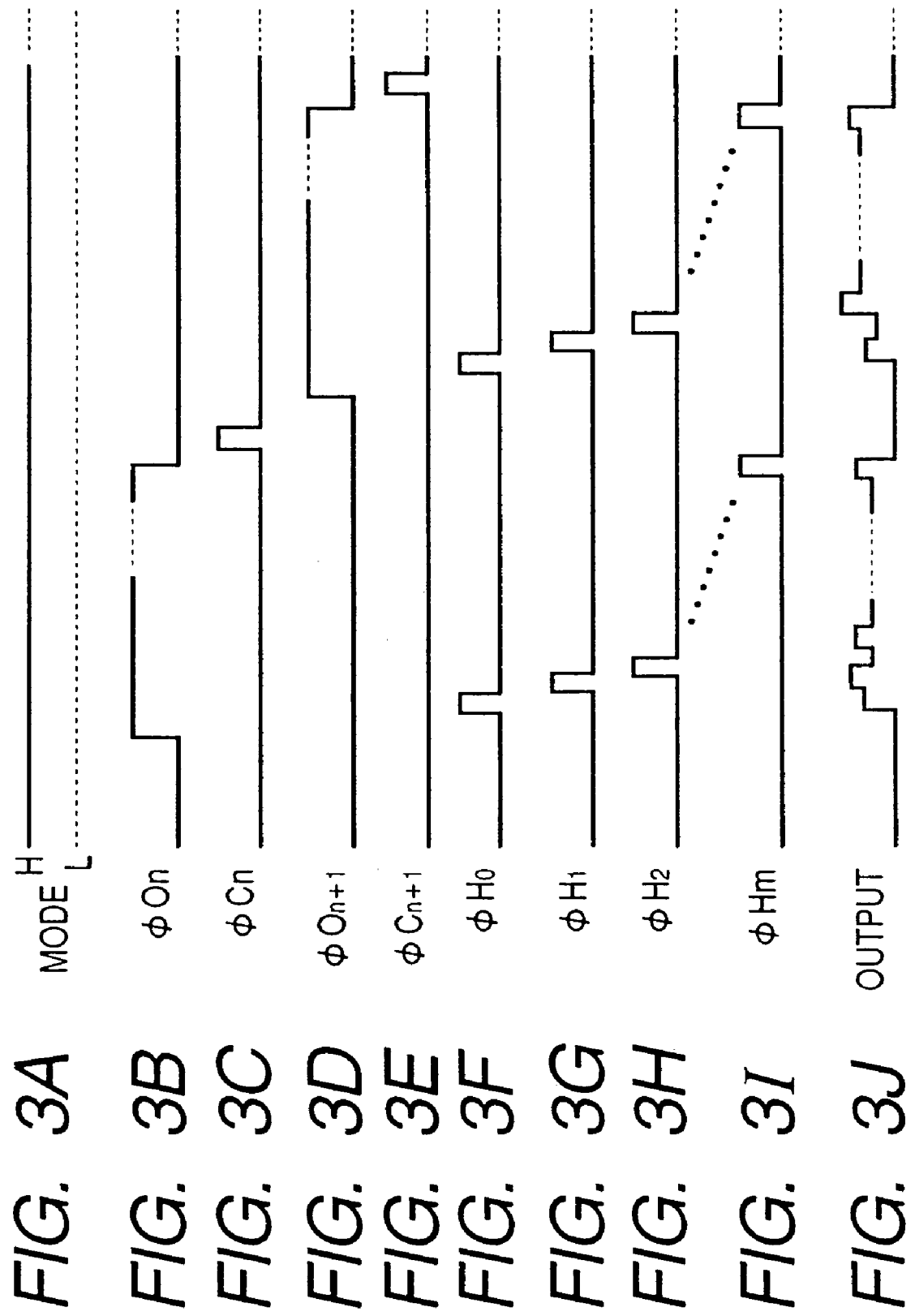
FIGS. 3A, 3B, 3C, 3D, 3E, 3F, 3G, 3H, 3I and 3J are timing charts illustrating a normal read operation.

FIGS. 3A to 3J are timing charts illustrating the normal read operation with reset, and FIGS. 4A to 4J are timing charts illustrating the non-destructive read operation without reset. First, with reference to FIGS. 3A to 3J, the normal read operation will be described. As shown in FIG. 3A, during the normal read operation, a high level mode switching signal is supplied from the comparator 112 to the AND gate 132. In this state, as shown in FIG. 3B, when a signal $\phi O_n$ (high level) is output from the vertical shift register 130, the vertical output switching MOS transistor 137 is turned on.

At this time, since the circuit including the MOS transistor 138 for reading constitutes a source follower which is an amplification circuit having a voltage gain of about 1, signal charges of the photoelectric conversion element 139 are directly read out to the vertical read line 141. Although omitted in FIGS. 3A to 3J, a plurality of pixel portions are arranged in the row direction. Signal charges of the pixel portions of one line along the row direction are read out to the vertical read lines 141. In FIGS. 3A to 3J, a plurality of pixel portions are arranged also in the column direction. A plurality of pixel portions 133 are therefore arranged in a matrix shape along the row and column directions.

Next, as shown in FIG. 3F, when a signal $\phi H_0$ is output from the horizontal shift register 131, the horizontal output switching MOS transistor 135 turns on. Therefore, as shown in FIG. 3J, outputs on the vertical read lines 141 are read out to the horizontal output line 142. Thereafter, as shown in FIGS. 3G to 3I, signals $\phi H_1, \phi H_2, \ldots, \phi H_n$ are sequentially output from the horizontal shift register 131, and as shown in FIG. 3J, signal charges of pixels of one line along the row direction are sequentially read out to the horizontal read line 142. With the above operations, reading the first line along the row direction is completed.

Next, as shown in FIG. 3C, when a signal $\phi C_n$ is output from the vertical shift register 130 to the AND gate 132, the reset MOS transistor 136 turns on so that signal charges of the photoelectric conversion element 139 are initialized (reset). Similarly, signal charges of other pixel portions of one line along the row direction are reset so that during the next accumulation period, charges are newly accumulated in the photoelectric conversion elements.

Next, as shown in FIG. 3D, for the pixels of the second row (not shown), a signal $\phi O_{n+1}$ is output from the vertical shift register 130 and the vertical output switching MOS transistor 137 turns on. Signal charges of the photoelectric conversion elements 139 of the pixel portions of the second row are therefore read out to the vertical read lines 141. As shown in FIGS. 3F to 3I, signals $\phi H_0$ to $\phi H_m$ are sequentially output from the horizontal shift register 131, and as shown in FIG. 3J, signal charges of the vertical read lines 141 are sequentially read out to the horizontal output line 142.

Thereafter, as shown in FIG. 3E, a signal $\phi C_{n+1}$ is output from the vertical shift register 130 to the AND gate 132 to reset the photoelectric conversion elements 139 of the pixel portions of the second row. Similarly thereafter, signal charges of the pixel portions of the third row, fourth row, . . . are read out. When the signal charges of the last n-th line are read out, reading all the pixel portions of the X-ray image sensing panel 111 is completed.

Figure 4:
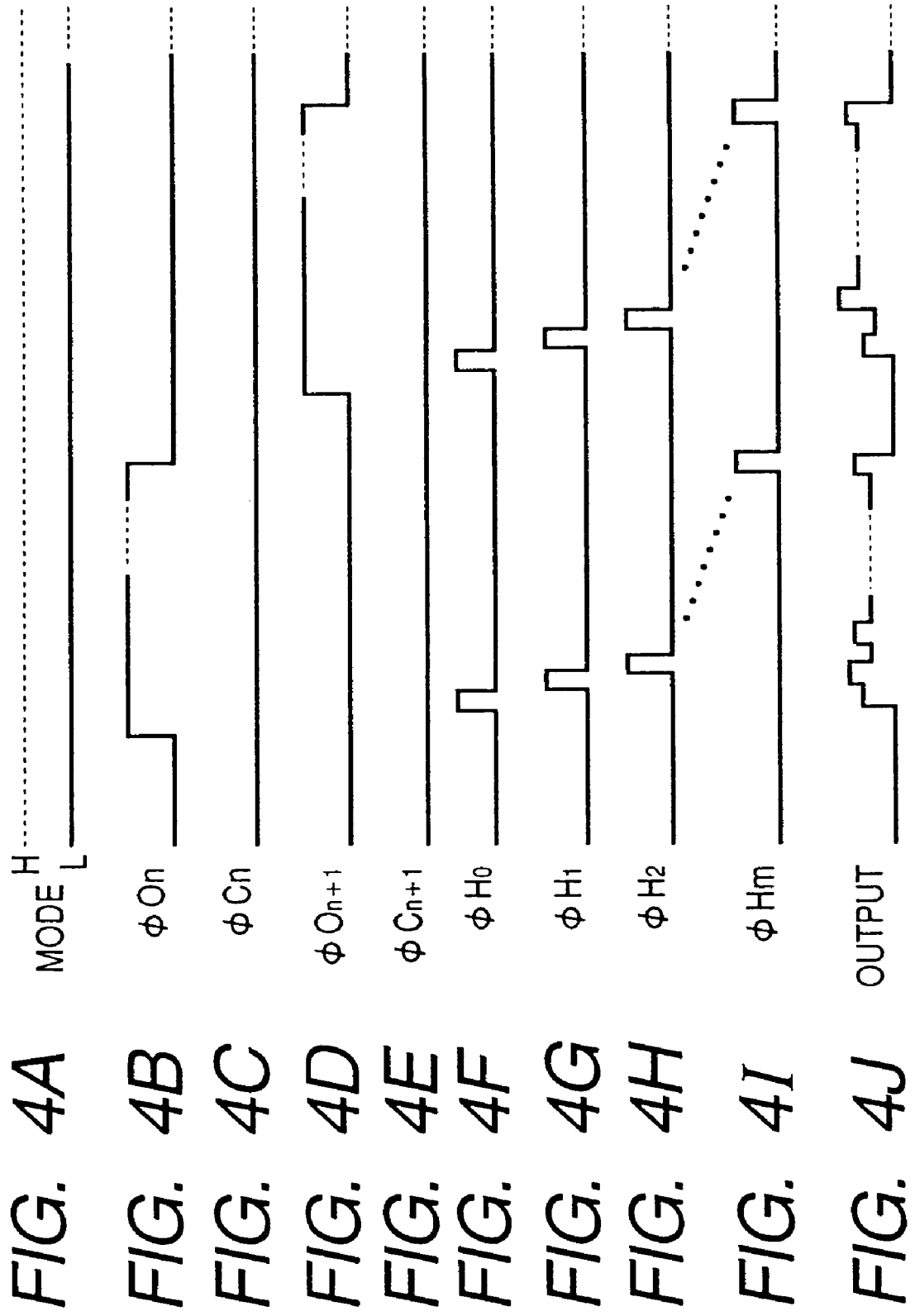
FIGS. 4A, 4B, 4C, 4D, 4E, 4F, 4G, 4H, 4I and 4J are timing charts illustrating a non-destructive read operation.

Next, with reference to FIGS. 4A to 4J, the non-destructive read operation will be described. During the normal read operation, after signal charges are read out, they are reset, whereas during the non-destructive operation, after signal charges are read out, they are not reset. This is a different point between the two read operations. As shown in FIG. 4A, therefore, a low level mode switching signal is supplied from the comparator 112 to maintain the AND gate 132 to be closed.

In this state, as shown in FIG. 4B, when a signal $\phi O_n$ is output from the vertical shift register 130, the vertical output switching MOS transistor 137 is turned on. Signal charges of the photoelectric conversion elements 139 are therefore read out to the vertical read lines 141 via the read MOS transistors 138. Next, as shown in FIG. 4F, when a signal $\phi H_0$ is output from the horizontal shift register 131, the horizontal output switching MOS transistor 135 turns on. Therefore, as shown in FIG. 4J, outputs on the vertical read lines 141 are read out to the horizontal output line 142. Thereafter, as shown in FIGS. 4G to 4I, signals $\phi H_1, \phi H_2, \ldots, \phi H_n$ are sequentially output from the horizontal shift register 131, and as shown in FIG. 4J, signal charges of pixels of one line along the row direction are sequentially read out to the horizontal read line 142. With the above operations, reading the first line along the row direction is completed.

Next, as shown in FIG. 4D, for the pixels of the second row (not shown), a signal $\phi O_{n+1}$ is output from the vertical shift register 130 and the vertical output switching MOS transistor 137 turns on. Signal charges of the photoelectric conversion elements 139 of the pixel portions of the second row are therefore read out to the vertical read lines 141. As shown in FIGS. 4F to 4I, signals $\phi H_0$ to $\phi H_m$ are sequentially output from the horizontal shift register 131, and as shown in FIG. 4J, signal charges of the vertical read lines 141 are sequentially read out to the horizontal output line 142.

Similarly thereafter, signal charges of the pixel portions of the third row, fourth row, . . . are read out. When the signal charges of the last n-th line are read out, reading all the pixel portions of the X-ray image sensing panel 111 is completed. In the non-destructive read mode, therefore, after signal charges of the pixel portions are read out, signal charges of the photoelectric conversion elements are not reset but the next accumulation starts. Namely, the charge amount does not change before and after reading the pixel portion, and the read operation does not influence the photoelectric conversion element. In this embodiment, the non-destructive reading of the X-ray image sensing panel 111 is used to correct FPN.

Figure 5:
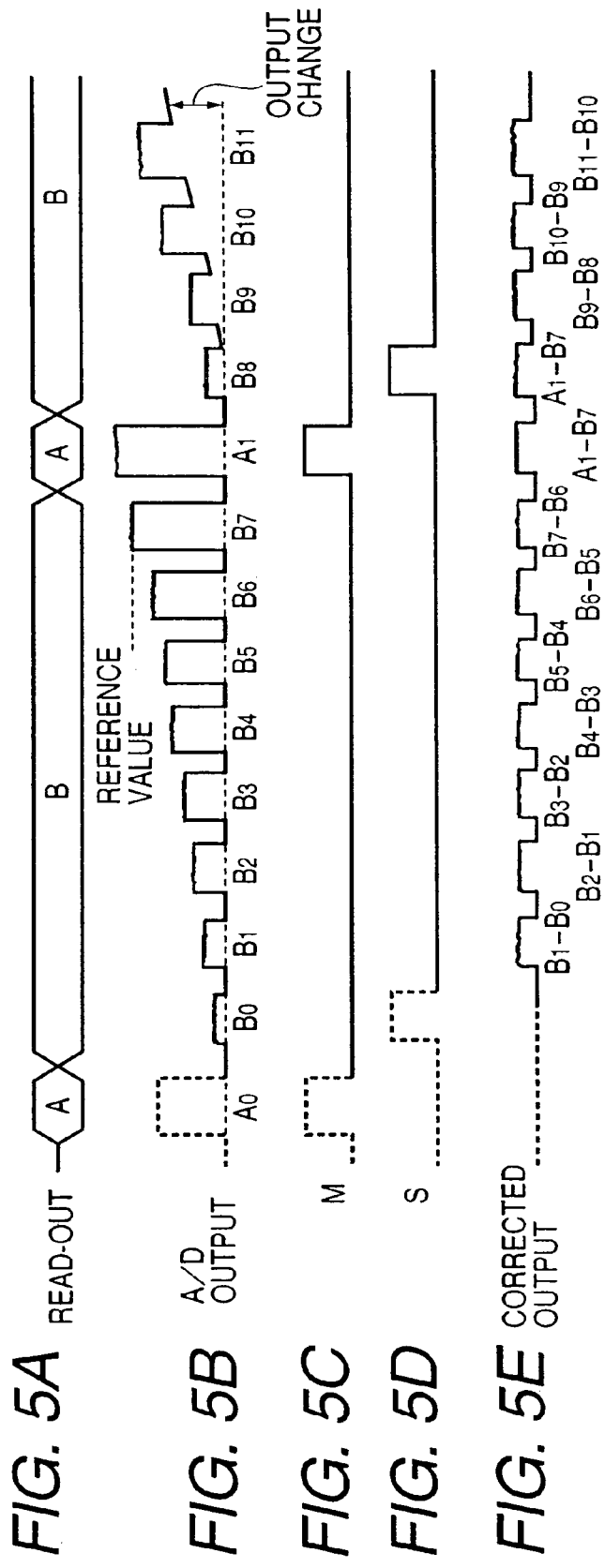
FIGS. 5A, 5B, 5C, 5D and 5E are timing charts illustrating the operation of the embodiment shown in FIG. 1.

FIGS. 5A to 5E are timing charts illustrating the operation of this embodiment. With reference to FIG. 1 and FIGS. 5A to 5E, a specific operation of the embodiment will be described. In sensing a moving image, an X-ray is radiated from the X-ray source 101 to the subject 103. The X-ray passed through the subject 103 becomes incident upon the X-ray image sensing panel 111 which detects an image. FIG. 5A illustrates a read mode of sensing a moving image. A represents the normal read mode, and B represents the non-destructive read mode.

During the moving image sensing, as shown in FIG. 5A, the non-destructive read B is used which is switched after each pixel of the X-ray image sensing panel 111 is reset during the normal read A. FIG. 5B shows an output of the A/D converter 104. When the read mode is switched to the non-destructive read B, a signal is read out from the X-ray image sensing panel 111 by the operation described with reference to FIGS. 4A to 4J. As shown in FIG. 5B, the non-destructive reading $B_0, B_1, B_2, B_3, \ldots$ are performed for each frame by the A/D converter 104. The output values of pixels of each frame during the non-destructive reading are sequentially stored in the one-frame memory 116.

The subtractor 117 subtracts an output value of each pixel of the previous frame stored in the one-frame delay memory 116 from a current output value of the corresponding pixel output from the A/D converter 104, and outputs the corrected values as shown in FIG. 5E. Namely, the subtractor 117 performs a process of subtracting an output value of each pixel of the previous frame from a current output value of the corresponding pixel, and outputs the corrected values $(B_1-B_0), (B_2-B_1), (B_3-B_2), \ldots$ each corresponding to a difference between an output value of each frame and the output value of the previous frame stored in the one-frame delay memory 116.

The corrected values output from the subtractor 117 are supplied via the switch 119 to the monitor 109 and recording medium 110. The sensed image is displayed on the monitor 109 and stored in the recording medium 110 as image data. During the non-destructive read, the switch 119 is turned to the side a, and the corrected values output from the subtractor 117 are supplied via the switch 119 to the monitor 109 and recording medium 110. As will be described later, the switch 119 is turned to the side b after the normal read, in response to the signal from the timing conversion circuit 120.

Since the output value of the A/D converter 104 is provided by non-destructive read and thus the charge of each pixel of the X-ray image sensing panel 111 is sequentially accumulated during the non-destructive read without resetting. As shown in FIG. 5B, the output value of the A/D converter increases gradually. The comparator 112 monitors the output value of the A/D converter 104. As shown in FIG. 5B, when the output value of the A/D converter 104 becomes larger than the reference value in the non-destructive read $B_7$, the high level mode switching signal is output via the delay 113 to the X-ray image sensing panel 111. This mode switching signal is delayed by the delay 113 by a predetermined time, and supplied to the AND gate 132 of the X-ray image sensing panel 111 as described with reference to FIG. 2.

The delay time of the delay 113 is the time from the frame at which the output value of the A/D converter 104 exceeded the reference value to the frame following that frame, as shown in FIG. 5C. This delay time prevents the read mode from being changed at the midst of the frame. During the ordinary case, the switch 114 is maintained on, whereas it is maintained off for the defective pixel and invalid area as described earlier. The reference value of the comparator 112 is set to a value slightly lower than the output value of the A/D converter 104 at a time when the pixel of the X-ray image sensing panel 111 is saturated.

When the read mode is changed to the normal read mode, signals are read from the X-ray image sensing panel 111 by the operation described with FIGS. 3A to 3J. As shown in FIG. 5B, one frame is read by the ordinary read $A_1$. In this case, as described with FIGS. 3A to 3J, after signals are read from the respective pixels, the corresponding photoelectric conversion elements are reset. After the normal read $A_1$, the output value of the A/D converter 104 lowers so that the mode switching signal from the comparator 104 is inverted to the low level as shown in FIG. 5C, and the mode is switched to the non-destructive read as shown in FIG. 5B. Signals are therefore sequentially read out by the non-destructive operations $B_8, B_9, B_{10}, \ldots$ An output signal of the comparator 112 is also supplied via the delay 113 to the timing conversion circuit 120. The timing conversion circuit 120 is constituted of a delay circuit for delaying the timing by one frame. As shown in FIG. 5D, a signal output from the timing conversion circuit 120 is delayed by one frame from the mode switching signal (FIG. 5C). The signal output from the timing conversion circuit 120 is supplied to the switch 119 so that the switch 119 is turned to the side b. Namely, as shown in FIG. 5E, the corrected value obtained by subtracting the output value of the previous frame from the current output value is not provided as a normal value for the frame following the normal read. Namely, the corrected value for the frame following the normal read is $(B_8-A_1)$, but this is not provided as a normal value.

In this embodiment, therefore, the switch 119 is turned to the side b so that the corrected value for the previous frame stored ih.the one-frame delay memory 118 is output as shown in FIG. 5D. Since the previous corrected value $(A_1-B_7)$ is stored in the one-frame delay memory 118, the previous corrected value $(A_1-B_7)$ is output for the frame following the normal read as shown in FIG. 5E. In this case, therefore, although the corrected value $(A_1-B_7)$ is output twice, the quality of the whole image is not considerably influenced.

Similarly thereafter, a signal is read out from the X-ray image sensing panel 111 during the non-destructive read, and the output value of the previous frame is subtracted from the current output value to output the corrected value. This operation is repeated. When the output value of the A/D converter 104 exceeds the reference value, the read mode is changed to the ordinary read mode, and the corrected value of the previous frame is output for the frame following the normal read. This operation is repeated to continuously sense a moving image.

As described above, in this embodiment, signals are sequentially read out in the non-destructive read, and the image signal is corrected by subtracting the output value of the previous frame from the current output value. It is therefore possible to correct FPN. In addition, even if an offset of an output amplifier of the X-ray image sensing panel changes with a power supply fluctuation, a temperature change or the like, a change in the offset hardly affects the corrected value. More specifically, a change in the offset is slower than the frame rate and is negligible. Therefore, as shown in FIG. 5B, even if the output values such as those during the non-destructive reading $B_8, B_9, B_{10}, \ldots$ are changed by the influence of the offset, the corrected output values are hardly influenced by the change in the offset. An image sensing apparatus resistant to offset or other fluctuation can be realized.

Furthermore, since the signals read out by the non-destructive read without reset are used, there is no influence of KTC noises and a high S/N ratio can be realized. For the corrected value for the frame following the normal read, the corrected value for the previous frame is used. Therefore, corrected values can be obtained continuously and the moving image can be sensed continuously.

Although not shown in FIG. 1, a counter may be connected to the output of the comparator 112 to count the number of times when the output of the A/D converter exceeds the reference value. When the count of this counter exceeds a reference value, the read mode may be changed from the non-destructive read mode to the normal read mode. In this case, it is possible to prevent the read mode from being more frequently switched. The previous corrected value is output for the frame following the normal read because the corrected value is not correct. However, in the above case, the read mode is not switched frequently so that the image quality can be improved.

In the embodiment described above, phosphor is used for converting an X-ray into visual light. Instead of phosphor, a general scintillator, i.e., a wave conversion body may be used. A photoelectric conversion element itself without phosphor may also be used if it can directly detect radiation waves and generate charges.

In the embodiment, although an X-ray is used, other radiation waves such as α, β and γ rays may also be used.

As described so far, according to the embodiment, signals are sequentially read out in the non-destructive read, and a difference between the output value of the previous frame and the current output value is output as the corrected value. It is therefore possible to correct FPN. In addition, even if an offset of an output amplifier of the X-ray image sensing panel changes with a power supply fluctuation, a temperature change or the like, a change in the offset hardly affects the corrected value and a good image quality can be realized. Furthermore, since the signals read by the non-destructive read without reset are used, there is no influence of KTC noises and a high S/N ratio can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

image pickup means for picking up an object image, wherein the image pickup means is arranged to be non-destructively readable;

driving means for driving said image pickup means so that a first frame image picked up by said image pickup means is non-destructively read out from said image pickup means when a first time period elapses without reset of said image pickup means during the first time period after said image pickup means is reset, a second frame image picked up by said image pickup means is non-destructively read out from said image pickup means when a second time period elapses without reset of said image pickup means during the second time period after the first time period, and a third frame image picked up by said image pickup means is non-destructively read out from said image pickup means when a third time period elapses without reset of said image pickup means during the third time period after the second time period; and subtraction means for effecting a subtraction process between said first and second frame images derived by non-destructive reading, and for effecting a subtraction process between said second and third frame images derived by non-destructive reading, and for outputting frame images resulting from the subtraction processes sequentially.

2. An apparatus according to claim 1, further comprising a comparator arranged to compare an output value read out from said image pickup means with a predetermined reference value, wherein a read-out mode of said image pickup means is switched to a normal read-out mode when the output value exceeds the predetermined reference value.

3. An apparatus according to claim 1, wherein said image pickup means includes one or more pixel portions, wherein each pixel portion includes a photoelectric conversion element and a read-out transistor, and wherein each pixel portion is arranged so that the photoelectric conversion element is connected to a control terminal of the read-out transistor.

4. An apparatus according to claim 3, wherein a non-control terminal of the read-out transistor is connected to a load, and wherein the read-out transistor is constructed by an amplifier having a voltage amplification factor of one.

5. An apparatus according to claim 4, wherein the load includes a constant current source or a resistor.

6. An apparatus according to claim 3, wherein the read-out transistor is connected in series to a switching transistor for selecting pixel portions arranged in a row direction.

7. An apparatus according to claim 1, wherein the photoelectric conversion element is connected in series to a reset transistor, and wherein a read-out mode of said image pickup means is switched between a normal read-out mode and a non-destructive read-out mode by controlling the reset transistor in accordance with a mode switching signal.

8. An apparatus according to claim 2, further comprising a counter which is connected to an output of said comparator and which determines a count value representing the number of times that the output value exceeds the predetermined reference value, wherein a read-out mode of said image pickup means is switched from a non-destructive read-out mode to the normal read-out mode when the count value reaches a predetermined value.

9. An apparatus according to claim 2, further comprising storing means for storing a corrected value for every frame image, wherein said storing means is arranged to output the corrected value of a previous frame image for a frame image immediately following the normal read-out mode.

* * * * *